Inventor
JACQUES MULLER
By (signature)
Attorney

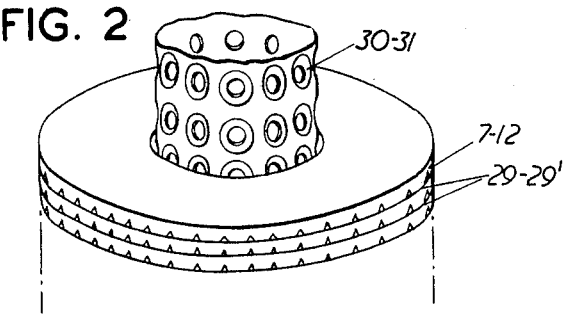
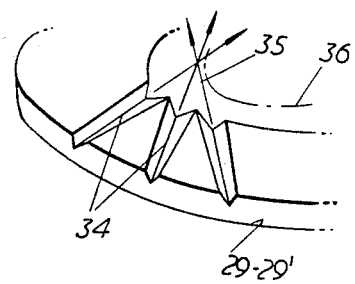
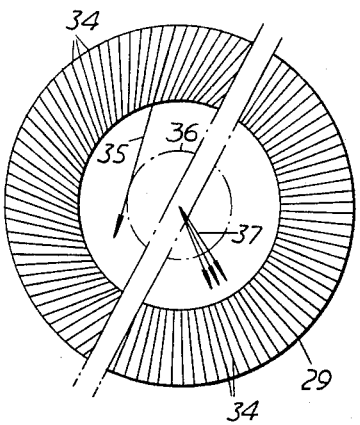
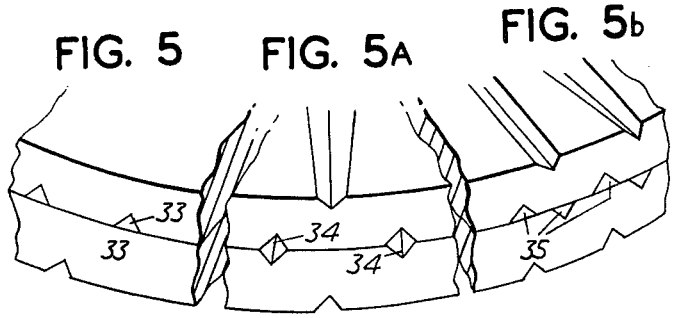

3,214,368
Patented Oct. 26, 1965

3,214,368
METHOD AND APPARATUS FOR TREATING IMMISCIBLE LIQUIDS
Jacques Muller, La Garenne-Colombes, France, assignor to Reilumit Inter, S.a.r.L., La Garenne-Colombes, France, a corporation of France
Filed June 12, 1963, Ser. No. 287,346
Claims priority, application France, Nov. 27, 1959, 811,411, Patent 1,249,998
16 Claims. (Cl. 210—23)

This application is a continuation-in-part of copending application Serial No. 69,054, filed November 14, 1960, now abandoned.

This invention relates to a method and apparatus for treating immiscible liquids, for example, water and oil or water and petroleum products, having the same or different densities, to secure their filtration, separation and recovery. The method and apparatus rely for their operation mainly upon the physical phenomena of surface tension and viscosity, differences in density between the liquids being of minor importance.

It is known that different liquids have different surface tensions and viscosities, which affect the resistance they offer to flow through small orifices or capillary passages, and the method and apparatus according to the present invention make use of these characteristics, in place of the decantation methods based on differences in density which have been utilized heretofore, the results of which are often imperfect and are in any case produced much more slowly.

It is known that if a mixture or an emulsion made up of two normally immiscible liquids such as oil and water are forced through a fine filter, separation will take place to a degree which varies in dependence upon a number of factors, including the size of the pores or orifices in the filter material. I have found that this separation takes place as a result of the differences in surface tension and viscosity of the different liquids, so that by using a filter element of a kind in which the size of the filter orifices may be precisely established and controlled, it is possible to ensure more efficient and more complete separation of two liquids than has hitherto been possible. The type of filter which has hitherto been used for separation does not lend itself to precise dimensions with regard to the size of the pores or orifices, since such filter is usually of a kind in which the filtering element or elements is of a fibrous or ceramic nature in which the sizes of the pores therein extend over a range of sizes.

One of the difficulties in obtaining satisfactory operation of apparatus to carry out the method according to the invention is to construct capillary passages of predetermined cross section which in practice do not become obstructed or which, in case of partial obstruction, may easily and rapidly be cleared. The invention provides apparatus which includes passages having these desirable characteristics.

One object of the invention is to provide an efficient method and apparatus for separating, filtering and recovering immiscible liquids by virtue mainly of the differences in surface tensions and viscosities of the liquids.

Another object of the invention is to provide a separator containing degassing columns and filtering and separating columns formed of assemblies of superimposed rings having micrometric grooves formed on one or both of their flat surfaces.

Another object is to provide a separator containing discs having micrometric grooves assembled one against the other in which the cross section of the grooves increases in the direction of flow so that impurities or foreign matter are arrested at the entry points to the passages and fall to the bottom of the container of the apparatus.

A further object is to provide separating apparatus composed of rings, having micrometric grooves, assembled one against the other in which any partial obstruction of the grooves may rapidly be cleared by establishing a temporary counterflow of the liquid through the grooves.

In one aspect, the invention consists of a method of separating, filtering and recovering immiscible liquids comprising applying them under pressure to one or more separating columns each including an assembly of rings one against the other, each ring being provided with micrometric grooves on at least one surface, the micrometric grooves being of such cross section that the liquids offer substantially different resistances to flow therethrough by virtue of their different surface tensions and viscosities, only one of the liquids passing through the column.

According to another aspect of the invention, apparatus is provided for separating, filtering and recovering immiscible liquids which comprises a container having a lower inlet compartment provided with an inlet connection, an upper discharge compartment provided with a plurality of outlet connections, one or more degassing and filtering columns each having its inlet in communication with the lower compartment and its outlet in communication with the upper compartment, each degassing and filtering column comprising a plurality of rings assembled in a stack, each ring being provided on at least one surface with micrometric grooves of such dimension that the liquids and air or other gaseous fluid flow through the said grooves and are reconstituted into a substantially globular form during their passage, and one or more separating columns in the upper compartment of similar structure to the degassing and filtering columns but having micrometric grooves of smaller dimension to separate the liquids by virtue of the differences in surface tension and viscosity thereof.

Conveniently the lower compartment comprises a relief valve with means for manual actuation which operates automatically for regulating the pressure in the lower compartment and is manually operable to discharge impurities or foreign matter collected in the lower compartment. There may be a centrally disposed receptacle within the upper compartment, the receptacle being closed at its lower end and open at its upper end, the separating column or columns being disposed within the receptacle, the liquids flowing upwardly between the wall of the container and the wall of the receptacle after leaving the degassing column and then flowing downwardly into the receptacle to the separating column whereby the receptacle forms a deviator, one of the said outlet connections communicating with the outlets from the separating columns for discharging one liquid together with air or other gaseous fluids. Preferably each ring is formed on at least one surface with micrometric grooves leading from its outer to its inner diameter, the micrometric grooves increasing in cross section in the direction of liquid flow. The rings may be formed with micrometric grooves on both surfaces and in that case the rings may be assembled so that the ends of the micrometric grooves at the outer diameters of abutting surfaces of adjacent rings are coincident or offset from each other.

To facilitate a ready understanding of the invention and the means by which it may be carried into practical effect, a selected embodiment will now be described, by way of example, having reference to the accompanying drawings, in which:

FIGURE 2 is a fragmentary perspective view showing a portion of a filtering column;

FIGURE 3 is a fragmentary perspective view on a larger scale of a portion of one ring showing the micrometric grooves;

FIGURE 4 is a partial plan view of a filter ring showing the micrometric grooves on the surface of a ring, disposed according to one form of the invention;

FIGURE 4a is a view similar to that of FIGURE 4 showing the grooves arranged radially;

FIGURE 5 is a fragmentary perspective view of an assembled pair of filter rings according to one embodiment of this invention;

FIGURE 5a is a view similar to that of FIGURE 5 showing a second embodiment;

FIGURE 5b is a view similar to that of FIGURE 5 showing a third embodiment; and

Figure 1:
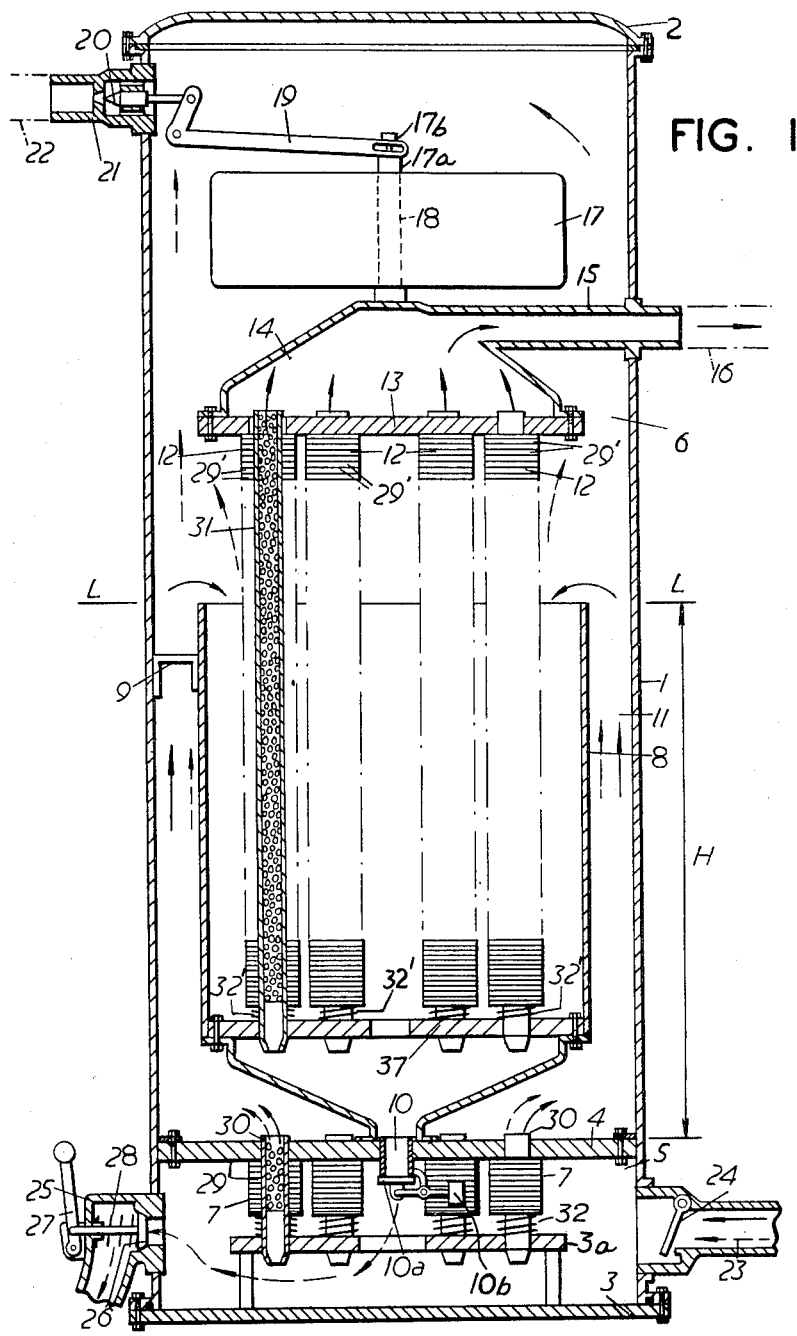
FIGURE 1 is a sectional view taken through an apparatus according to the invention.

Referring first to FIGURE 1, the separating apparatus comprises a tubular vertical outer casing or container 1 closed at its upper end by a detachable cover 2 and at its lower end by a detachable base 3. An internal horizontal partition 4 near the lower end of the container divides it into a lower compartment 5 and an upper compartment 6. A series of degassing and filtering columns 7 are arranged in the lower compartment 5, each column including a tube 30 closed at its lower end, the upper portion of the tube being perforated and opening at its upper end through partition 4 to the upper compartment 6, the perforated portion of the tube being surrounded by a number of separating rings assembled thereon in a stack, which will be described in more detail later. The separating rings of each stack are kept in close contact by springs 32 acting between the respective stack of rings and a sub-base 3a supported on and spaced above the base 3. A tubular receptacle 8 is concentrically disposed within the upper compartment 6. The top of the receptacle 8 is open and is at a level L which is disposed at a height H above the partition 4. The receptacle 8 has a funnel-shaped bottom having an outlet 10 into the lower compartment 5 which will be referred to in more detail later. The receptacle 8 is maintained in its concentric position within the upper compartment 6 of container 1 by means of fixing lugs 9, so that there is an annular passageway between the outer container 1 and the receptacle 8.

The opening 10 has a tube fitted within it which is closed by an automatic nonreturn valve 10a having a small counterweight 10b to keep it closed and prevent liquid from passing directly from the lower compartment into the upper compartment. The valve 10a will, however, open if the pressure in the upper compartment is raised substantially above that of the lower compartment during operation, and this will be referred to later.

Arranged within the receptacle 8 is a series of separating columns, generally designated 12, which are located at their lower ends in a header plate 37 just above the funnel-shaped lower end of the receptacle 8, and at their upper ends in a header plate 13. The separating columns 12 are similar in construction to the degassing and filtering columns 7, each consisting of a tube 31 closed at its lower end, perforated at its upper part and surrounded by a stack of filtering and separating rings 29' (see also FIGURE 2) assembled one against the other, which are kept in close contact by means of springs 32'.

The upper ends of the perforated tubes 30 comprised in the columns 12 open into a conically shaped header or chamber 14 above the plate 13 which is provided with a pipe 15 that passes sideways through the outer container 1 and constitutes an outlet connection for a flow pipe line 16 (indicated in chain-dotted lines) which passes to a tank or cistern or to a waste disposal arrangement.

Above the conical chamber 14 is a float 17 having a central tube 17a which may move vertically on a rod 18 fixed to the upper part of the conical chamber 14. The central tube 17a is connected by a pin 17b to linkage 19 coupled to a needle valve 20 cooperating with a seat formed in an outlet connection 21 which is adapted for connection to a pipe line 22 indicated in chain-dotted lines, which passes to a recovery tank (not shown).

An inlet pipe line 23 terminates in an inlet connection provided with a nonreturn valve 24, the connection opening into the lower compartment 5 of the container. The liquids to be separated enter through the valve 24 but if the pressure in the lower compartment 5 exceeds the inlet pressure, then the valve 24 closes to prevent reverse flow.

To prevent the pressure in the lower compartment 5 from exceeding a predetermined maximum, an outlet fitting 25 is provided containing a valve 26 loaded by a spring 28. Associated with the valve 26 is a hand lever 27 by which the valve may be opened manually. The outlet fitting 25 communicates with a pipe line the end of which communicates with the supply vessel (not shown) in which the liquids to be separated are contained, so that the valve 26 functions as a bypass.

Each of the degassing and filtering and separating columns 7 and 12 is formed of a stack of rings 29 or 29' (FIGURE 2) assembled on a perforated tube 30 or 31, the rings being held in close contact with each other by a spring. The degassing and filtering columns 7 are considerably shorter than the separating columns 12.

The rings 29, 29' are made of a plastic or other suitable material and comprise micrometric grooves 34 which may be tangential to an imaginary circle 36 as indicated by the arrow 35 in FIGURE 4, or they may be radial, as indicated by the arrows 37 in FIGURE 4a. The grooves are deeper at the inner diameter of the ring than they are at the outer diameter, being of gradually increasing cross section in the direction of liquid flow, which is from the outer diameter towards the inner diameter in the ring clearly shown in FIGURE 3.

The micrometric grooves formed in the rings used in the columns 7 are of larger cross section than the grooves in the rings used in the columns 12. The sizes of the grooves in the rings in the columns 7 are so chosen in relation to the controlled pressure in the inlet compartment 5 that the liquids pass through them but in so doing are reconstituted in substantially molecular or globular form, and air or other gaseous fluids are separated. The grooves in the rings of the columns 12 are of such size that the liquids offer very different resistances to flow through the grooves by virtue of their different surface tensions and viscosities.

The micrometric grooves are formed on one or on both surfaces of each ring and they may be arranged in different ways, as shown in FIGURES 5, 5a and 5b. In FIGURE 5, two rings are shown each provided with grooves 33 on one surface with the grooved face of one ring assembled against the plain surface of the adjacent ring. In FIGURE 5a, the two rings shown have micrometric grooves formed on both their surfaces and they are assembled in such a manner that the ends of the grooves at the outer diameters of abutting surfaces of adjacent rings are coincident. In FIGURE 5b, the two rings are also provided with grooves on both their surfaces but they are so assembled that the ends of the grooves in abutting surfaces of adjacent rings are offset from each other.

The operation of the apparatus is as follows: The liquids to be separated, for example, oil and water, are fed under pressure through the inlet 23 and enter the compartment 5. They then pass via the micrometric grooves from the outside to the inside of the separator rings 29 comprised in the columns 7, through the perforations in the tubes 30 and upwardly through the bores of these tubes into the upper compartment 6. In passing through these columns, the more or less emulsified state of the liquids and air or other gases is broken up so as to reconstitute the liquids in globular form, the globules having an affinity or attraction for each other.

After leaving the columns 7, the liquids and gases pass upwardly through the annular spaces between the receptacle 8 and the outer container 1. During the upward passage of the liquids, the lighter globules (i.e. the oil and gases) tend to accumulate at the top of the apparatus while the heavier globules (water), together with some of the oil and gases, pass downwardly into the receptacle 8 which thus forms a "deviator." The water and gases pass easily through the micrometric grooves in the columns 12 but the oil carried with the water into the receptacle 8 does not enter the columns 12 because of its higher viscosity and surface tension, so that the globules of oil remain outside the columns 12 and gradually rise to the top of the outer container 1. The oil and some gas are discharged through the outlet fitting 21 and the pipe line 22 to a suitable tank or other receiver (not shown).

Air or other gases carried by the water pass through the micrometric grooves of the column 12 with the water. The water and air or gases enter the conical chamber 14 and are discharged through the pipe line 16. Some of the water also collects in the receptacle or deviator 8 below the level L where, due to the low velocity of movement of the liquids, there is a complementary separation due to the differences in density.

The pressure-regulating valve 26 is set to provide pressure differences which are necessary for correct operation of the apparatus. Due to the fact that the micrometric grooves are of increasing cross section in the direction of flow of the liquids, any foreign matter present is held at the entrances to the micrometric grooves, i.e. against the outer diameters of the rings 29, 29'. In general, this foreign matter will gradually fall away but if partial obstruction of the grooves should in time occur, it may easily be overcome by providing a counterflow for a short period, that is, by applying pressure to the discharge pipe line 16 so that liquid flows in the reverse direction through the columns 12 and 7. Upon application of the reverse pressure, the water level in the compartment 6 rises until the float 17 is raised to close the oil outlet valve 20, whereupon the valve 24 closes to prevent a reverse flow of liquid into the supply line, the valve 10a opens to allow water and foreign matter to pass from the receptacle 8 to the compartment 5, and the valve 26 opens to allow water and foreign matter, as well as untreated liquids, to pass outwardly. The reverse flow under pressure dislodges all the particles of foreign matter adhering to the outsides of the columns 7 and 12.

If desired, an additional float (not shown) may be provided for closing the discharge outlet 16 should there be a failure in the apparatus (possibly because of a disturbance in the control of the operating pressures) resulting in the unintentional arrival of the other liquid (oil) at this discharge point.

The term "micrometric" used herein in relation to the grooves is intended to estabish the fact that the grooves in the rings of columns 7 and the grooves in the rings of columns 12 of the separator according to the invention are of a small definable order as to size so that all the grooves in a particular filter column are of substantially the same size. All grooves are of substantially equilateral triangular cross section.

As stated above, the grooves are of a definable order as to size. This means that an advantage hitherto unknown in separators is achieved by the present invention, namely, a separator can be provided having grooves all of which are of a known size best suited to the particular function which the separator is to perform. A convenient way of describing the groove sizes, especially the size of their inflow ends, is by reference to a circle which could theoretically, at least, be inscribed in the ends of grooves arranged as shown in FIGURES 5 and 5b or could be inscribed in the rhomb formed by the registering grooves shown in FIGURE 5a. Such circles, in separators according to the invention, range from approximately 5 microns to approximately 70 microns in diameter.

The size of the triangles is selected having regard for the liquids to be separated out of immiscible liquids and to the relative viscosity and surface tension of the liquids at a given temperature.

The following table, given by way of example only, indicates, by reference to the diameter of a circle, inscribable in a triangle or rhomb as above set forth, the size of grooves in the rings of columns 12 that have been found best for separating from water, oil at 20° C. having the viscosity specified in the table. The reference in the table to globular size refers to the smallest size of the globules found, by microsopic examination, for the oil specified in the table that is present in the liquid after the liquid has passed through the grooves in the rings of columns 7. The size of the grooves in the rings of columns 7 is from three to four times the size of the grooves in columns 12 in order to pass both liquids therethrough to perform the de-emulsification of the immiscible liquids.

| Oil | Dimensions of the globules (microns) | Diameter of inscribable circle (microns) | Viscosity at 20° C. | |
|---|---|---|---|---|
| | | | Centistokes | Seconds Saybolt |
| Kerosene | 20 | 7 | 2.25 | 35 |
| Domestic fuel oil | 30 | 9 | 9.5 | 57 |
| Light fuel oil | 50 | 17 | 46 | 240 |
| Heavy fuel oil No. 1 (one sample) | 75 | 25 | 700 | 4,000 |
| Heavy fuel oil No. 1 (second sample) | 100 | 35 | | |
| Heavy fuel oil No. 2 | 200 | 70 | 4,000 | 20,000 |

Figure 6A:
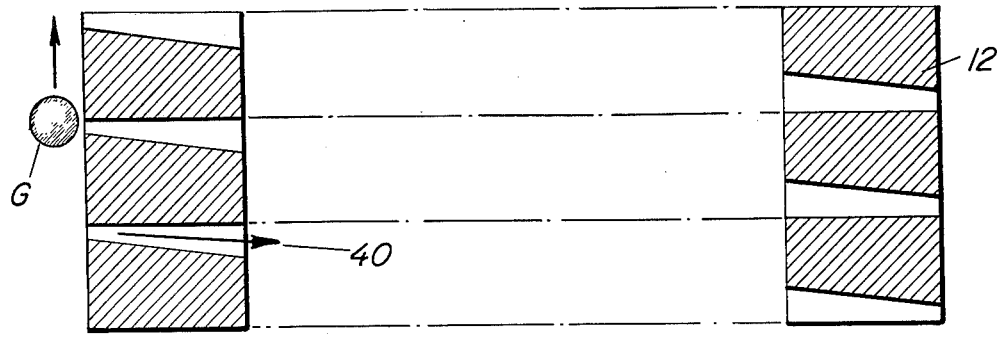
FIGURES 6a, 6b and 6c are schematic diagrams illustrating the operation of the invention.
Figure 6B:
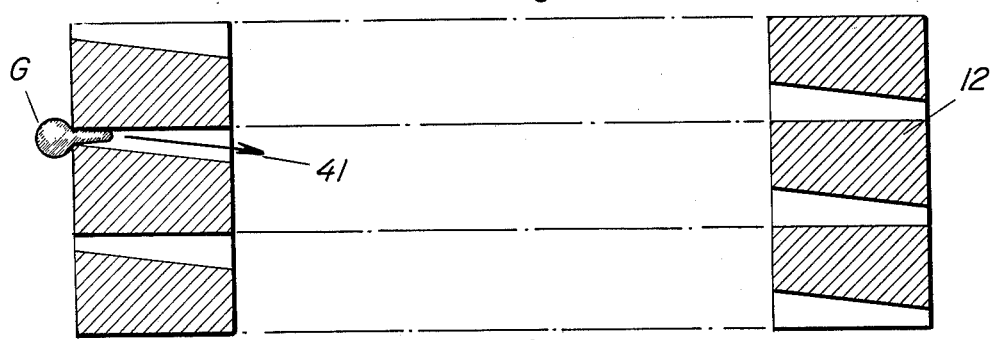
Figure 6C:
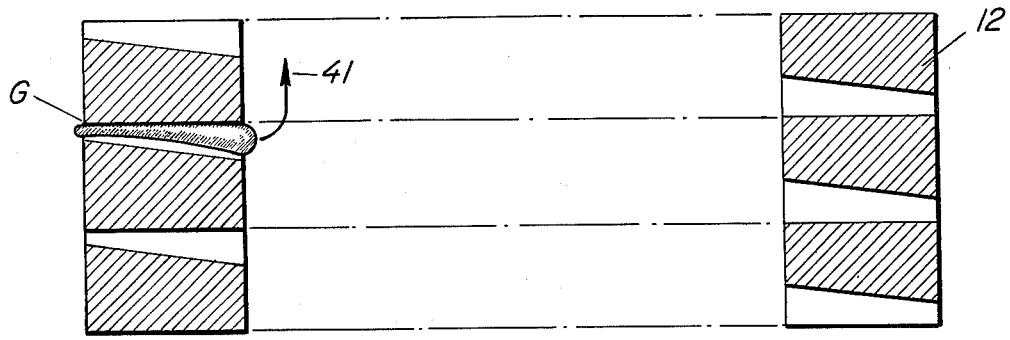

A factor which has to be considered in determining the size of the grooves of the rings of columns 12 is the operating pressure at which the two unseparated liquids are delivered to the columns 12. If the pressure on each side of the filtering column 12 is at its required value with regard to the immiscible liquids being separated, the globules G representing one of the immiscible liquids such as oil will not pass through the grooves while the other of the immiscible liquids such as water will readily pass through the grooves in the direction of arrow 40. If the pressure is too great, some globules G of the liquid of greater viscosity are forced into the grooves as shown in FIGURE 6b, the globules being made by the pressure to take a filamentary form illustrated in FIGURE 6c so as to pass into and through the grooves as represented by the arrow 41. As a result, separation is inefficient. On the other hand, if the pressure is too low, inefficient separation also results. In order to ensure efficient separation, therefore, the liquid pressure has to be regulated by a valve giving optimum results with the groove sizes (entry end sizes) found to be most suitable for separating any two particular immiscible liquids. The test is, of course, the extent to which either of the liquids delivered by the apparatus is contaminated, if contaminated at all, by the other.

The pressure can be regulated by a feed pump with automatic means for regulating its output pressure to a required value or the liquid pressure can be adjusted to the required value by appropriate adjustment of the valve 26.

It has been found that the pressure should be regulated in accordance with the viscosity of the oil to be separated, for instance, for various oils the mean pressure should be approximately as follows:

Grams per square centimeter
Gas oil or kerosene _____ 200
Domestic fuel oil _____ 400
Heavy fuel oil No. 1 _____ 500
Heavy fuel oil No. 2 _____ 700
Crude oil or heavier fuel oil _____ 800

Test results show that the material of which the rings of the columns 7 and 12 are made is practically speaking without influence. So far as the rings of columns 12 are concerned, it is a matter of the resistance of the molecules of one of the liquids to deformation in relation to the resistance of the molecules of the other of the liquids to deformation which is of importance. For example, water has virtually no resistance to deformation, but oil molecules or globules have so much more resistance to deformation than water that water readily flows into the grooves whereas oil globules resist taking the deformed shape which would enable them to pass through grooves having a smaller entry and cross section than the diameter of the globules. Hence, whether the rings are of oil-wettable material or of water-wettable material, the separation effect of the rings is for all practicable purposes the same.

From the foregoing, it is important that the triangular grooves be of a size such that the passages formed by the grooves alone or a pair of grooves can have a circle inscribed in the cross section thereof and such circle will be of a diameter less than the diameter of the smallest globule of the most viscous liquid to resist entry of even said smallest globules into the passages. The ratio of the diameter of the inscribed circle to the diameter of the smallest globule of the most viscous liquid is advantageously about 1:3 as indicated in the table.

It will be clear that the apparatus described and shown may be modified in various ways according to the intended application or for reasons of space or because of the nature of the liquids to be separated. It is possible for example, to add a device (not shown) for pre-heating the liquids or for heating them while passing through the apparatus so as to facilitate their separation. No particular temperatures are recommended. If any heating is employed it is only to decrease the viscosity and thereby increase the rate of flow and the speed of separation.

The filtering and separating elements may be formed into groups arranged in cascade.

Having described my invention, I claim:

1. Apparatus for separating, filtering and recovering immiscible liquids comprising a container having an inlet compartment provided with an inlet, an outlet compartment provided with a plurality of outlets, at least one degassing and filtering column having an inlet in communication with said inlet compartment and an outlet in communication with said outlet compartment, each said degassing and filtering column comprising a plurality of stacked discs of liquid-impervious material each having a central opening, each said disc being provided on at least one surface with micrometric grooves of substantially the same size as each other extending from the outer to the inner peripheral surface thereof, and at least one liquid-separating column in said outlet compartment of similar structure to said degassing and filtering columns but having micrometric grooves in its discs of substantially the same size as each other but of smaller dimensions than the grooves of the degassing columns, and each said liquid-separating column having an inlet communicating with said outlet compartment and an outlet connected to one of said outlets.

2. Apparatus as claimed in claim 1 wherein said inlet compartment comprises a relief valve including means for manual actuation thereof, said valve operating automatically for regulating the pressure in said inlet compartment and being manually operable to discharge impurities and foreign matter collected in said inlet compartment.

3. Apparatus as claimed in claim 1 comprising a receptacle centrally disposed within said outlet compartment, said receptacle being closed at its lower end and open at its upper end, said separating column being disposed within said receptacle, said liquids flowing upwardly between the wall of said container and the wall of said receptacle after leaving said degassing and filtering column and then flowing downwardly into said receptacle to said separating column whereby said receptacle forms a deviator, one of said outlets in said outlet compartment communicating with the outlet from said separating column for discharging one liquid together with air or other gaseous fluids.

4. Apparatus as claimed in claim 3, comprising a nonreturn valve at the bottom of said receptacle adapted to open on the application of counterflow pressure to establish communication between said inlet and outlet compartments and allow impurities and foreign matter to pass from said receptacle to said inlet compartment.

5. Apparatus as claimed in claim 4 comprising a further nonreturn valve in said inlet adapted to close when counterflow pressure is applied to said inlet compartment, and manual means for opening said further nonreturn valve.

6. Apparatus as claimed in claim 1 wherein the outlet for the lighter liquid includes a nonreturn valve, and a float in said outlet compartment adapted to close said nonreturn valve when it is raised due to the presence of the heavier liquid.

7. Apparatus as claimed in claim 1 wherein the grooves of each disc increase in cross section in the direction of liquid flow.

8. Apparatus as claimed in claim 1 wherein said discs are formed with micrometric grooves on both surfaces.

9. Apparatus as claimed in claim 8 wherein said discs are assembled with the ends of the micrometric grooves at the outer diameter of abutting surfaces of adjacent discs coincident.

10. Apparatus as claimed in claim 8 wherein said discs are assembled with the ends of the micrometric grooves at the outer diameters of abutting surfaces of adjacent discs offset relatively to each other.

11. Apparatus for separating, filtering and recovering immiscible liquids comprising a container having an inlet compartment provided with an inlet connection, an outlet compartment provided with a plurality of outlet connections, at least one degassing and filtering column having an inlet in communication with said inlet compartment and an outlet in communication with said outlet compartment, each said degassing and filtering column comprising a plurality of stacked discs of liquid-impervious material each having a central opening, each said disc provided on at least one surface with micrometric grooves of substantially the same size as each other extending from the outer to the inner peripheral surface thereof and of increasing cross section in the direction toward the column outlet, and at least one liquid-separating column in said outlet compartment of similar structure to said degassing and filtering columns but having micrometric grooves in its discs of substantially the same size as each other but of smaller dimensions than the grooves of the degassing columns, each said liquid-separating column having an inlet communicating with said outlet compartment and an outlet connected to one of said outlet connections 12. Apparatus for separating, filtering and recovering immiscible liquids comprising container means having a lower compartment and an upper compartment, inlet means disposed in said lower compartment, a plurality of outlet means disposed in said upper compartment, at least one degassing and filtering column disposed in said lower compartment, said degassing and filtering column being provided with an inlet in communication with said lower compartment and an outlet in communication with said upper compartment, said degassing and filtering column including a plurality of rings assembled in a stack, means engaging said rings to maintain same in close contact with each other, each of said rings having disposed in at least one surface thereof micrometric grooves that extend from the outer periphery to the inner periphery of the ring, said grooves having substantially the same cross-sectional dimension as each other so that said immiscible liquids and gaseous fluids flow from said inlet means into said lower compartment through said grooves and outlet of said degassing and filtering column into said upper compartment thereby causing the immiscible liquids and gaseous fluids when passing through the grooves to attain a substantially globular form, and at least one separating column disposed in said upper compartment similar in structure to that of said degassing and filtering column, the micrometric grooves in the rings of said separating column being of substantially the same cross-sectional dimension as each other but having a smaller cross-sectional dimension than that of the grooves of the rings of said degassing and filtering column so that the liquid of said immiscible liquids having the least surface tension and viscosity passes through the smaller dimension grooves of said separating column to one of said plurality of outlet means while the liquid of said immiscible liquids having the higher surface tension and viscosity passes instead of through the smaller dimension grooves to another of said plurality of outlet means.

13. Apparatus for separating, filtering and recovering immiscible liquids comprising a container having a lower compartment provided with an inlet connection and an upper outlet compartment provided with a plurality of outlet connections, at least one degassing and filtering column having its inlet in communication with said lower compartment and its outlet in communication with said upper compartment, an automatic bypass valve for regulating the pressure in said lower compartment, means for manually opening said bypass valve to discharge impurities from said lower compartment, a centrally disposed receptacle within said upper compartment closed at its lower end and open at its upper end, at least one separating column disposed in said receptacle, one of said outlet connections communicating with the outlet from each said separating column for discharging one of said liquids and air or other gaseous fluids combined therewith, another of said outlet connections in said upper compartment for discharging another liquid comprising a nonreturn valve, and a float in said upper compartment adapted to close said nonreturn valve when it rises, said degassing and filtering and separating columns each comprising a plurality of rings assembled in a stack, each said ring being provided on at least one surface with micrometric grooves through which said liquids must flow, the cross section of said grooves being larger in said degassing and filtering column than in said separating column.

14. Apparatus as claimed in claim 13 comprising a nonreturn valve at the bottom of said receptacle adapted to open to allow impurities to pass from said receptacle to said lower compartment.

15. A method of separating, filtering and recovering immiscible liquids comprising the steps of passing all said liquids under pressure through at least one degassing and filtering column containing a stack of rings formed with micrometric grooves each being substantially the same size in cross section, and then bringing said liquids under pressure into contact with at least one separating column containing a stack of rings each formed with micrometric grooves of substantially the same size as each other in cross section but smaller than that of the grooves of said degassing and filtering column, whereby only one of said liquids passes through said separating column.

16. A method according to claim 15 wherein the grooves in the rings of the separating column form flow passages of a size such that a circle inscribed in the cross section thereof will be of a diameter less than the diameter of the smallest globule of the most viscous liquid of the mixture to be separated to resist entry of even the smallest globules of the most viscous liquid into the passages.

References Cited by the Examiner
UNITED STATES PATENTS

| | | | |
|---|---|---|---|
| 2,523,793 | 9/50 | Vance | 210—314 |
| 2,773,602 | 12/56 | Sylvester | 210—130 |
| 2,922,750 | 1/60 | Price | 210—314 |
| 2,953,249 | 9/60 | Topol et al. | 210—23 X |

FOREIGN PATENTS

| | | |
|---|---|---|
| 1,141,129 | 3/57 | France. |

MORRIS O. WOLK, *Primary Examiner.*